United States Patent
Park

(10) Patent No.: US 6,507,668 B1
(45) Date of Patent: Jan. 14, 2003

(54) IMAGE ENHANCING APPARATUS AND METHOD OF MAINTAINING BRIGHTNESS OF INPUT IMAGE

(75) Inventor: Hong-gi Park, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/460,975

(22) Filed: Dec. 15, 1999

(30) Foreign Application Priority Data

Dec. 15, 1998 (KR) .............................. 98-55038

(51) Int. Cl.[7] .............................................. G06K 9/00
(52) U.S. Cl. .................. 382/169; 382/167; 382/170; 382/272; 382/274; 382/254; 382/260; 358/522; 358/518; 358/463
(58) Field of Search ............................... 382/168, 169, 382/170, 274, 272, 254, 167, 260, 270; 358/522, 518, 463

(56) References Cited

U.S. PATENT DOCUMENTS 6,018,588 A * 1/2000 Kim ........................... 382/167
6,049,626 A * 4/2000 Kim ........................... 382/167

FOREIGN PATENT DOCUMENTS

JP 10-126647 5/1998

* cited by examiner

Primary Examiner—Phuoc Tran
Assistant Examiner—Ali Bayat
(74) Attorney, Agent, or Firm—Sughrue Mion, PLLC

(57) ABSTRACT

An image enhancing apparatus is provided and includes a histogram equalizer and a compensating circuit. The histogram equalizer equalizes an input image, which is expressed by a predetermined number of gray levels, and outputs a corresponding equalized output image. The compensating circuit determines an input mean value corresponding to the input image and an output mean value corresponding to the output image and calculates a mean difference based on the input and output mean values. Then, the compensating circuit adjusts the equalized output image based on the mean difference to prevent a reduction in the mean brightness of the equalized output image. As a result, a reduction in the mean brightness of a light screen can be avoided and any deterioration of the output signal caused by the histogram equalization can be prevented to provide a stable image display. In-addition, a method performed by the apparatus is also provided.

19 Claims, 3 Drawing Sheets

IMAGE ENHANCING APPARATUS AND METHOD OF MAINTAINING BRIGHTNESS OF INPUT IMAGE

BACKGROUND OF THE INVENTION

1. Field of the Invention

The present invention relates to a method and apparatus that enhance an image based on histogram equalization. More particularly, the present invention relates to an image enhancing apparatus and method that improve the contrast of an output image by maintaining the brightness of a corresponding input image.

This application is based on Korean Patent Application No. 98-55038 (filed on Dec. 15, 1998) which is incorporated herein by reference.

2. Description of the Related Art

In a histogram equalization operation, an input image is modified in accordance with a histogram of the input image. In one application, the histogram represents the gray level distribution of the input image, and the content of the gray level distribution provides a global description of the appearance of the input image. By properly adjusting the gray level distribution of the input image in accordance with the distribution of pixels of the image, the contrast and appearance of the image is enhanced.

FIG. 1 is a block diagram of a general histogram equalizer that performs a histogram equalization operation on pixels I(x,y) (x=1 to p; y=1 to q) of an input image $\{X\}$. Each of the pixels I(x,y) of the input image $\{X\}$ has one of L discrete gray levels (i.e. $\{X_0, X_1, \ldots, X_{L-1}\}$) and is located at a spatial position (x,y). The gray level $X_0$ equals 0 and represents a black level, and the gray level $X_{L-1}$ equals 1 and represents a white level.

As shown in the figure, the histogram equalizer comprises a histogram detector 102, a probability density function ("PDF") calculator 104, a PDF integrator 106, and a nonlinear mapper 108. The histogram detector 102 calculates an occurrence frequency $n_k$. The occurrence frequency $n_k$ represents the number of times that the pixels I(x,y) have a gray level corresponding to $\{X_k | k \in \{0, 1, 2, \ldots, L-1\}\}$. In other words, the detector 102 calculates the number of times $n_0$ that the pixels I(x,y) have the gray level $X_0$, the number of times $n_1$ that the pixels I(x,y) have the gray level $X_1$, etc. The PDF calculator 104 calculates a probability density function $P(X_k)$ based on the occurrence frequency $n_k$ of the pixels in accordance with equation (1):

$$P(X_k) = n_k/N \quad (1)$$

In equation (1), the probability density function $P(X_k)$ represents the probability that a pixel of the input image $\{X\}$ has the k-th gray level $X_k$, $n_k$ represents the number of times that the k-th gray level $X_k$ appears in the image $\{X\}$, and N represents the number of total pixels of the image $\{X\}$.

The PDF integrator 106 calculates a cumulative density function ("CDF") c(x) by integrating the probability density function $P(X_k)$ calculated by the PDF calculator 104. Specifically, the cumulative density function c(X) is determined based on equation (2):

$$c(X) = \sum_{i=0}^{L-1} P(X_i) \quad (2)$$

The nonlinear mapper 108 modifies the input pixels I(x,y) of the input image $\{X\}$ based on the cumulative density function c(X) to produce output pixels $I_H(x,y)$ for the image $\{X\}$. Specifically, the mapper 108 uses the cumulative density function c(X) as a mapping function to perform a nonlinear mapping operation on the input pixels I(x,y) to produce the output pixels $I_H(X,y)$. By modifying the input pixels I(x,y) in such a way to produce the output pixels $I_H(x,y)$, the gray levels of the image $\{X\}$ have a wider dynamic range so that the contrast of the image $\{X\}$ is enhanced.

FIG. 2 illustrates how the input pixels I(x,y) are transformed into the output pixels $I_H(x,y)$ by using the cumulative density function as nonlinear mapping function when most of the gray levels the input pixels I(x,y) have a relatively high brightness level. Specifically, the gray levels of the input pixels I(x,y) are concentrated in the gray level range $\{X_i \sim X_{L-1}\}$. The input pixels I(x,y) are modified to produce the output pixels $I_H(x,y)$ by re-distributing the gray level range $\{X_i \sim X_{L-1}\}$ of the input pixels I(x,y) over a wider range $\{f(X_i) \sim f(X_{L-1})\}$ based on the cumulative density function c(X). Since the gray level range $\{f(X_i) \sim f(X_{L-1})\}$ of the output pixels $I_H(x,y)$ is greater than the range $\{X_i \sim X_{L-1}\}$ of the input pixels I(x,y), the contrast of the output image $\{X\}$ is enhanced.

As described above, the apparatus shown in FIG. 1 uses histogram equalization to enhance the contrast of an input image by evenly distributing the gray levels of the image over a predetermined dynamic range. Also, the contrast of the image is greatly enhanced with a minimal amount of computation, and thus, the apparatus is widely used for enhancing the contrast of images.

However, a serious problem arises when the histogram equalization operation is performed by the apparatus in FIG. 1. Specifically, since the cumulative density function is directly used as a mapping function to change the distribution of the gray levels of the input image, the mean brightness of the output image may substantially change based on the cumulative density function. In particular, the mean brightness of an image signal, which has been equalized such that the distribution of gray levels is uniform, converges on the middle gray level within the gray level range regardless of the brightness of the input image. Accordingly, when a bright image having a small number of pixels with dark gray levels is displayed on a bright screen, the image is slightly darkened, and thus, the quality of the image is degraded. Consequently, the histogram equalization operation performed by the apparatus is only used when a relatively dark image is displayed on dark screen. Thus, the histogram equalization operation performed by the apparatus is not used in a television or camcorder.

In other words, when using the histogram equalization operation described above to make the histogram distribution of an image uniform, the mean brightness converges on the middle level of the gray level range regardless of the brightness of the input image. Thus, the overall brightness in a dark screen increases, and thus, an invisible area of the dark screen becomes visible and enhances the image quality. However, the overall brightness in a light screen decreases with the contrast enhancement, and the image displayed on the light screen appears unnatural.

SUMMARY OF THE INVENTION

One object of the present invention is to provide an image enhancing apparatus in which the difference in mean brightness between an input image and an output image, which has been equalized using histogram equalization, is predicted. Then, the predicted result is reflected on the equalized output image signal to maintain the brightness of the input image in the equalized output signal.

Another object of the present invention to provide an image enhancing method in which the difference in mean brightness between an input image and an output image, which has been equalized using histogram equalization, is predicted. Then, the predicted result is reflected on the equalized output image signal to maintain the brightness of the input image in the equalized output signal.

In order to achieve the above and other objects, an image enhancing apparatus is provided. The apparatus comprises: a histogram equalizer circuit that equalizes an input image expressed by a predetermined number of gray levels and outputs a corresponding equalized output image; and a compensator circuit that determines an input mean value of the input image and an output mean value of the equalized output image, determines a mean difference based on the input mean value and the output mean value, and at least indirectly adjusts the equalized output image according to the mean difference.

In order to further achieve the above and other objects, an image enhancing method is provided. The method comprises: (a) equalizing an input image expressed by a predetermined number of gray levels and outputting a corresponding equalized output image; (b) determining an input mean value of the input image and an output mean value of the equalized output image; (c) determining a mean difference based on the input mean value and the output mean value; and (d) adjusting, at least indirectly, the equalized output image according to the mean difference.

BRIEF DESCRIPTION OF THE DRAWINGS

The above and other objects and advantages of the present invention will become more apparent by describing in detail preferred embodiments thereof with reference to the attached drawings in which.

DESCRIPTION OF THE PREFERRED EMBODIMENTS

The following description of the preferred embodiments discloses specific configurations, components, and process steps. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various configurations, components, and steps of the present invention that would have been known to one, skilled in the art are omitted for the sake of clarity and brevity.

Figure 3:
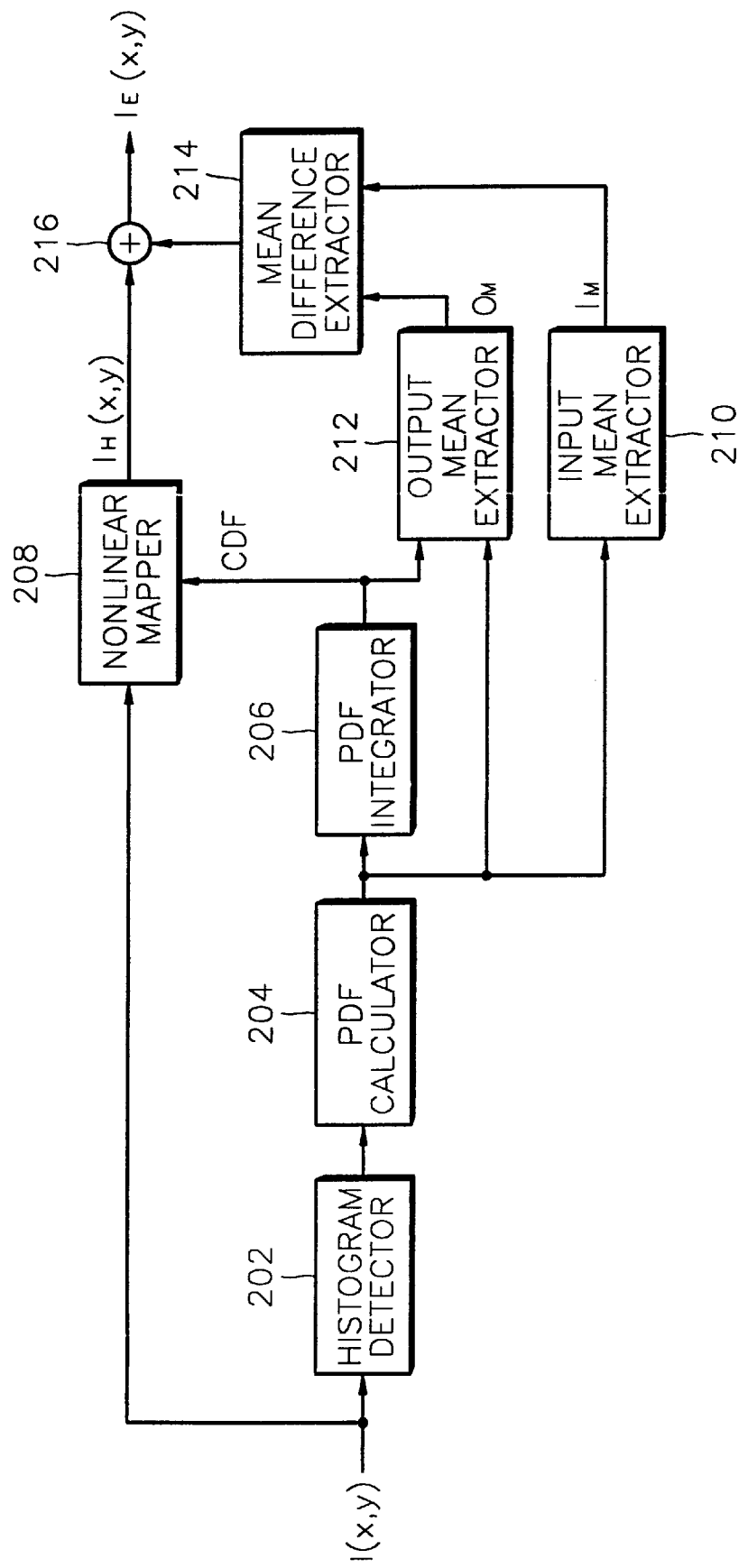
FIG. 3 is a block diagram of an image enhancing apparatus according to a preferred embodiment of the present invention.

FIG. 3 is a block diagram of an image enhancing apparatus according to a preferred embodiment of the present invention. As shown in the figure, the apparatus includes a histogram detector 202, a probability density function ("PDF") calculator 204, a PDF integrator 206, a nonlinear mapper 208, an input mean value extractor 210, an output mean value extractor 212, a mean difference extractor 214, and an adder 216.

Figure 1:
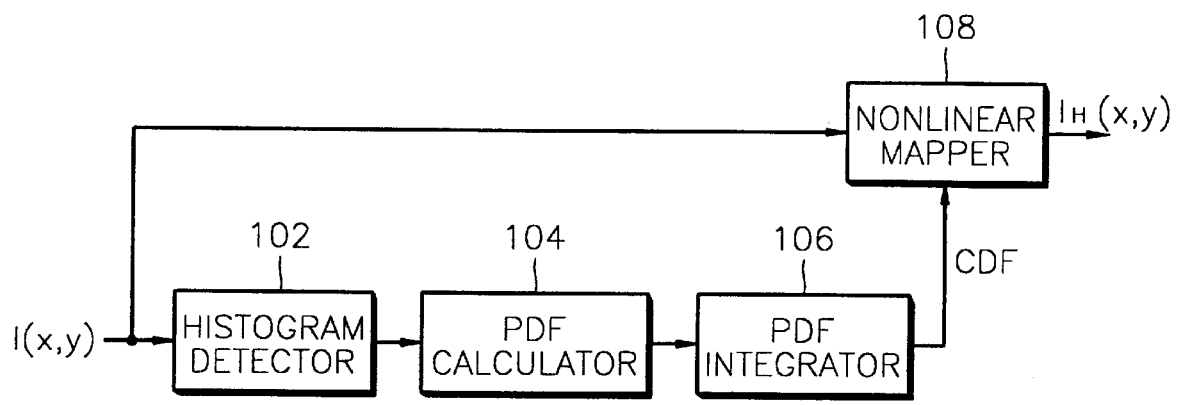
FIG. 1 is a block diagram of a general histogram equalizer.
Figure 2:
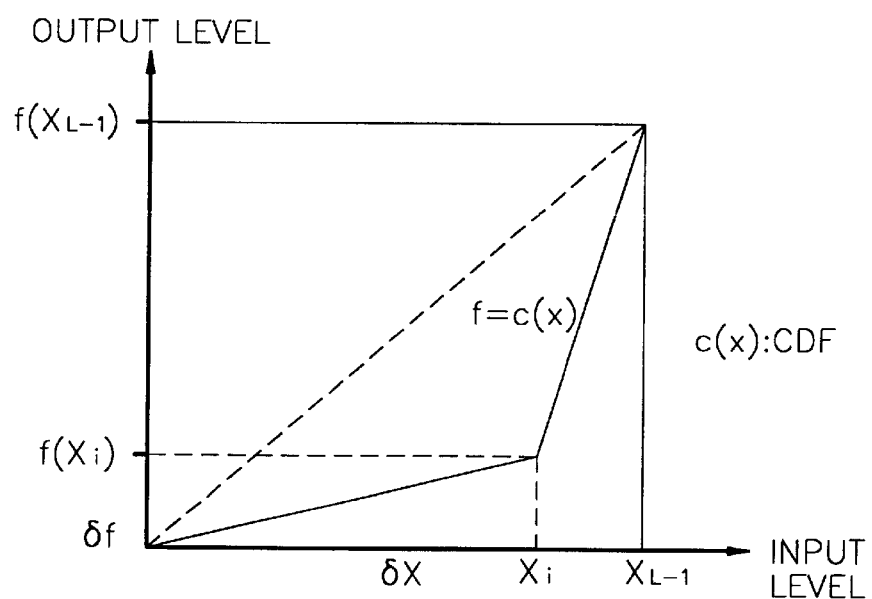
FIG. 2 is a graph illustrating a nonlinear mapping operation that is based on a cumulative density function and that is performed by the nonlinear mapper shown in FIG. 1.

The histogram detector 202, PDF calculator 204, PDF integrator 206, and nonlinear mapper 208 respectively have structures that are similar to the structures of the histogram detector 102, PDF calculator 104, PDF integrator 106, and nonlinear mapper 108 shown in FIG. 1. Therefore, such components will not be described in detail for the sake of brevity. Also, in FIG. 3, the histogram detector 202 and PDF calculator 204 are illustrated as separated devices in the present embodiment, but they can be constructed as a single device that is capable of detecting the histogram distribution of an input image and calculating the probability density function in accordance with the histogram distribution.

The input mean value extractor 210 determines an input mean value $I_M$ of the input pixels I(x,y) of an image based on the probability density function $P(X_k)$ determined by the PDF calculator 204. Also, the output mean value extractor 212 determines an output mean value $O_M$ of the output pixels $I_H(x,y)$ of the image provided by the nonlinear mapper 208. In particular, the output means value extractor 212 inputs the probability density function $P(X_k)$ from the PDF calculator 204 and the cumulative density function c(X) output from the PDF integrator 206 used to predict the mean value of the equalized output pixels $I_H(x,y)$ supplied from the nonlinear mapper 208. Then, the output mean value extractor 212 determines the output mean value $O_M$ based on the functions $P(X_k)$ and c(X). The mean difference extractor 214 calculates a mean difference $D_M$ based on the input mean value $I_M$ and the output mean value $O_M$. The adder 216 adds the mean difference $D_M$ from the mean difference extractor 214 to the value of the output pixels $I_H(x,y)$ supplied from the nonlinear mapper 208.

In the image enhancing apparatus described above, the difference $D_M$ corresponding to the mean value $I_M$ of the input image and the mean value $O_M$ of the equalized output image is determined. Then, the value of the equalized image is adjusted based on the mean difference $D_M$ so that the brightness of the output image can be maintained at the brightness level of the input image.

As indicated above, the mean value $I_M$ of an input image is primarily related to the brightness of the input image. One method for determining the mean value $I_M$ is to integrate the input image to produce an integrated result and to divide the integrated result by the screen size displaying the image (i.e. divide the integrated result by the total number of pixels). Also, in a preferred embodiment of the present invention, the input mean value extractor 210 calculates the mean value $I_M$ of the input image based on the probability density function $P(X_k)$ output from the PDF calculator 204. In the embodiment, the mean value $I_M$ is equal to a general mean value that is calculated by equation (3):

$$I_M = \sum_{k=0}^{L-1} P(X_k) \cdot X_k \tag{3}$$

In addition, in the preferred embodiment, the output mean value extractor 212 determines the output mean value $O_M$ of the equalized image output from the nonlinear mapper 208 using the probability density function $P(X_k)$ output from the PDF calculator 204 and the cumulative density function $c(X)$ output from the PDF integrator 206. In particular, the mean value $O_M$ is determined in accordance with equation (4):

$$O_M = \sum_{k=0}^{L-1} \{P(x_k) \cdot [(gmax - gmin) \cdot c(X) + gmin]\} \quad (4)$$

In equation (4), $P(X_k)$ represents the probability density function output from the PDF calculator 204, $c(X)$ represents the cumulative density function output from the PDF integrator 206, $[(gmax-gmin) \cdot c(X)+gmin]$ represents an example of a transform function that makes the histogram distribution used in the nonlinear mapper 208 uniform, and gmax and gmin represent the maximum and minimum values of the dynamic range of gray levels output by the nonlinear mapper 208. As a result, the output mean value $O_M$ is actually the same as the mean value output from the nonlinear mapper 208. In fact, the transform function used in the nonlinear mapper 208 is the same as the transform function in equation (4) so that the output from the nonlinear mapper 208 can be predicted by the output mean value extractor 212.

The mean difference extractor 214 determines the difference $D_M$ based on the input mean value $I_M$ and the output mean value $O_M$. In a preferred embodiment, the mean value of the image output from the nonlinear mapper 208 is adjusted only when the brightness of the output image is lower than the brightness of the input image. Specifically, if the input mean value $I_M$ is greater than the output mean value $O_M$, the mean difference $D_M$ is set equal to the difference between the mean values $I_M$ and $O_M$ (i.e. $D_M = I_M - O_M$) and is output to the adder 216. Then, the adder 216 adds the mean difference $D_M$ to the values of the output pixels (i.e. equalized signal) $I_H(x,y)$ supplied from the nonlinear mapper 208 and outputs a corresponding brightness compensated image signal $I_E(x,y)$. On the other hand, if the input mean value $I_M$ is less than or equal to the output mean value $O_M$, the mean difference $D_M$ is set equal to zero and is output to the adder 216. In such case, the adder 216 does not adjust the value of the equalized signal $I_H(x,y)$ and outputs the unmodified equalized signal $I_H(x,y)$ as the brightness compensated image signal $I_E(x,y)$.

Figure 4:
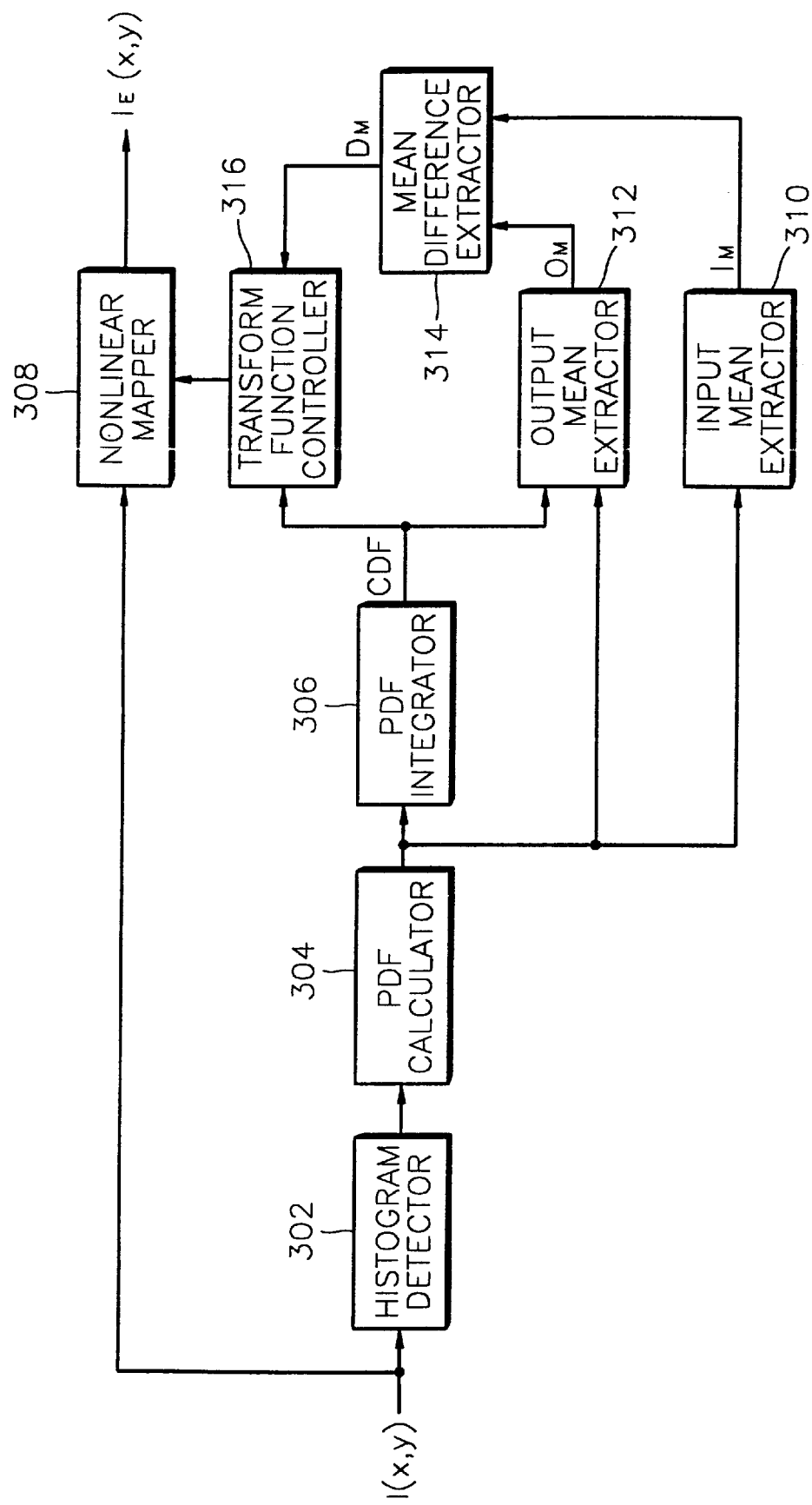
FIG. 4 is a block diagram of an image enhancing apparatus according to another preferred embodiment of the present invention.

FIG. 4 is a block diagram of an image enhancing apparatus according to another embodiment of the present invention. The image enhancing apparatus shown in FIG. 4 is the similar to the apparatus shown in FIG. 3, except that the apparatus comprises a transform function controller 316 instead of the adder 216. Thus, the present embodiment will be primarily described from the perspective of the transform function controller 316.

The transform function controller 316 controls the transform function used in the nonlinear mapper 308 based on the mean difference $D_M$ supplied from the mean difference extractor 314. Accordingly, the nonlinear mapper 308 outputs the equalized image $I_E(x,y)$ in which the brightness has been compensated. In a preferred embodiment, the transform function controller 316 changes the transform function of the nonlinear mapper 308 shown in equation (5) into the transform function shown in Equation (6). As shown in equations (5) and (6), the transform function controller 316 adds the mean difference $D_M$ from the mean difference extractor 314 to the maximum value gmax and the minimum value gmin of the dynamic range of gray levels output from the nonlinear mapper 308.

$$I_x = (gmax - gmin) \cdot c(X) + gmin \quad (5)$$

$$I_x = (gmax' - gmin') \cdot c(X) + gmin' \quad (6)$$

($gmax' = gmax + D_M$ and $gmin' = gmin + D_M$)

In another embodiment, the transform function controller 316 may change the cumulative density function $c(X)$ used the transform function of the nonlinear mapper 308. As a result, the nonlinear mapper 308 can output an equalized image $I_E(x,y)$, in which the brightness has been compensated, by mapping the input image $I(x,y)$ in accordance with the transform function controlled by the transform function controller 316.

As described above, the image enhancing apparatus and method of the present invention prevents the mean brightness of a light screen from being reduced when a histogram equalization operation is performed. Thus, the image produced by the apparatus and method is not deteriorated, and the apparatus and method can be incorporated and utilized in an apparatus such as a television or camcorder. In addition, the present invention can be applied to a wide variety of other image enhancing devices, such as broadcasting equipment, radar signal processing systems, electronic home appliances, and medical engineering equipment.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims and equivalents thereof.

What is claimed is:

1. An image enhancing apparatus, comprising:
    a histogram equalizer circuit that equalizes an input image expressed by a predetermined number of gray levels and outputs a corresponding equalized output image; and
    a compensator circuit that determines an input mean value of the input image and an output mean value of the equalized output image, determines a mean difference based on the input mean value and the output mean value, and at least indirectly adjusts the equalized output image according to the mean difference.

2. The image enhancing apparatus of claim 1, wherein the histogram equalizer circuit comprises:
    a first calculator circuit that detects a histogram distribution of the input image and calculates a probability density function according to the histogram distribution;
    a second calculator circuit that calculating a cumulative density function according to the probability density function; and
    a mapping circuit that uses the cumulative density function as at least part of a transform function to transform the input image to the equalized output image.

3. The image enhancing apparatus of claim 2, wherein the second calculator circuit calculates the cumulative density function by integrating the probability density function.

4. The image enhancing apparatus of claim 2, wherein the compensator circuit comprises:
    an input mean extractor circuit that determines the input mean value of the input image based on the probability density function;
    an output mean extractor circuit that determines the output mean value of the equalized output image using the probability density function and the cumulative density function;

a mean difference extractor circuit that determines the mean difference based on the input mean value and the output mean value; and an adder circuit that adds the mean difference to the equalized output image to adjust the brightness of the equalized output image.

5. The image enhancing apparatus of claim 4, wherein the mean difference output from the mean difference extractor circuit equals a difference between the input mean value and the output mean value when the input mean value is greater than the output mean value, and wherein the mean difference output from the mean difference extractor circuit equals zero when the input mean value is less than or equal to the output mean value.

6. The image enhancing apparatus of claim 2, wherein the compensator circuit comprises:

an input mean extractor circuit that determines the input mean value of the input image based on the probability density function;

an output mean extractor circuit that determines the output mean value of the equalized output image based on the probability density function and the cumulative density function;

a mean difference extractor circuit that determines the mean difference based on the input mean value and the output mean value; and a transform function controller circuit that adjusts the transform function used in the mapping circuit according to the mean difference.

7. The image enhancing apparatus of claim 6, wherein the mean difference output from the mean difference extractor circuit equals a difference between the input mean value and the output mean value when the input mean value is greater than the output mean value, and wherein the mean difference output from the mean difference extractor circuit equals zero when the input mean value is less than or equal to the output mean value.

8. The image enhancing apparatus of claim 6, wherein the transform function controller circuit adjusts the cumulative density function of the transform function according to the mean difference.

9. The image enhancing apparatus of claim 6, wherein the transform function controller circuit adjusts a dynamic range of the equalized output image according to the mean difference.

10. An image enhancing method, comprising:

(a) equalizing an input image expressed by a predetermined number of gray levels and outputting a corresponding equalized output image;

(b) determining an input mean value of the input image and an output mean value of the equalized output image;

(c) determining a mean difference based on the input mean value and the output mean value; and (d) adjusting, at least indirectly, the equalized output image according to the mean difference.

11. The image enhancing method of claim 10, wherein the step (a) comprises:

(a1) detecting a histogram distribution of the input image and calculating a probability density function according to the histogram distribution;

(a2) calculating a cumulative density function in accordance with the probability density function; and (a3) using the cumulative density function as at least part of a transform function to transform the input image to the equalized output image.

12. The image enhancing method of claim 11, wherein the step (a2) comprises:

(a2a) calculating the cumulative density function by integrating the probability density function.

13. The image enhancing method of claim 11, wherein the step (b) comprises:

(b1) determining the input mean value of the input image based on the probability density function; and (b2) determining the output mean value of the equalized output image using the probability density function and the cumulative density function.

14. The image enhancing method of claim 13, wherein the step (d) comprises:

(d1) adding the mean difference to the equalized output image to adjust the brightness of the equalized output image.

15. The image enhancing method of claim 14, wherein the step (c) comprises:

(c1) setting the mean difference equal to a difference between the input mean value and the output mean value when the input mean value is greater than the output mean value; and (c2) setting the mean difference equal to zero when the input mean value is less than or equal to the output mean value.

16. The image enhancing method of claim 13, wherein the step (d) comprises:

(d1) adjusting the transform function according to the mean difference.

17. The image enhancing method of claim 16, wherein the step (c) comprises:

(c1) setting the mean difference equal to a difference between the input mean value and the output mean value when the input mean value is greater than the output mean value; and (c2) setting the mean difference equal to zero when the input mean value is less than or equal to the output mean value.

18. The image enhancing method of claim 16, wherein the step (d1) comprises:

(d1a) adjusting the cumulative density function of the transform function according to the mean difference.

19. The image enhancing method of claim 16, wherein the step (d1) comprises:

(d1a) adjusting a dynamic range of the equalized output image according to the mean difference.

* * * * *